US009729535B2

(12) United States Patent
Lee et al.

(10) Patent No.: US 9,729,535 B2
(45) Date of Patent: Aug. 8, 2017

(54) METHOD OF SEQUENTIALLY AUTHENTICATING CAN PACKETS USING DIVIDED MACS AND APPARATUS FOR IMPLEMENTING THE SAME

(71) Applicants: Hyundai Motor Company, Seoul (KR); Kia Motors Corporation, Seoul (KR); Industry-Academic Cooperation Foundation, Chosun University, Gwangju (KR); SNU R&DB Foundation, Seoul (KR)

(72) Inventors: Byoung Wook Lee, Seoul (KR); Chung Hi Lee, Seoul (KR); Ho Yoo, Gyeonggi-do (KR); Ho Jin Jung, Seoul (KR); Hyun Soo Ahn, Seoul (KR); Ho Youn Kim, Seoul (KR); Young Sik Moon, Seoul (KR); Jun Young Woo, Seoul (KR); Young Sik Kim, Gwangju (KR); Kang Seok Lee, Gyeonggi-do (KR); Jong Seon No, Seoul (KR)

(73) Assignees: Hyundai Motor Company, Seoul (KR); Kia Motors Corporation, Seoul (KR); Industry-Academic Cooperation Foundation, Chosun University, Gwangju (KR); SNU R&DB Foundation, Seoul (KR)

(*) Notice: Subject to any disclaimer, the term of this patent is extended or adjusted under 35 U.S.C. 154(b) by 62 days.

(21) Appl. No.: 14/669,301

(22) Filed: Mar. 26, 2015

(65) Prior Publication Data
US 2016/0099926 A1    Apr. 7, 2016

(30) Foreign Application Priority Data
Oct. 2, 2014    (KR) .......................... 10-2014-0133320

(51) Int. Cl.
H04L 9/32 (2006.01)
H04L 29/06 (2006.01)
(Continued)

(52) U.S. Cl.
CPC ............ *H04L 63/08* (2013.01); *H04L 63/123* (2013.01); *H04L 67/12* (2013.01)

(58) Field of Classification Search
CPC ..... H04L 63/08; H04L 67/12; H04L 2209/84; H04L 9/3242; H04L 63/123; H04L 12/40;
(Continued)

(56) References Cited

U.S. PATENT DOCUMENTS 8,327,146 B2    12/2012    Madhavan et al.
2008/0104397 A1*    5/2008    Paddon ................ H04L 9/3242
713/168
(Continued)

FOREIGN PATENT DOCUMENTS

JP    2012-249107 A    12/2012
JP    2013-098719 A    5/2013
(Continued)

OTHER PUBLICATIONS

Nilsson, Dennis K., Ulf E. Larson, and Erland Jonsson. "Efficient in-vehicle delayed data authentication based on compound message authentication codes." Vehicular Technology Conference, 2008. VTC 2008—Fall. IEEE 68th. IEEE, 2008.*

*Primary Examiner* — Michael Simitoski
(74) *Attorney, Agent, or Firm* — Mintz Levin Cohn Ferris Glovsky and Popeo, P.C.; Peter F. Corless

(57) ABSTRACT

A method of transmitting K messages using divided message authentication codes (MACs) in a controller area network (CAN) includes: generating a MAC using a first message and a specific MAC, performing a first operation with respect to j using j-th messages subsequent to the first
(Continued)

message and a second MAC part of the generated MAC, performing a second operation with respect to j using a result of the performed first operation and a j-th subblock subsequent to a first MAC subblock among K MAC subblocks obtained by dividing a first MAC part of the generated MAC, transmitting the first message along with the first MAC subblock, and transmitting K-1 j-th messages in an order of j, each of the j-th messages being transmitted along with a j-th result of the performed second operation.

22 Claims, 5 Drawing Sheets

(51) Int. Cl.
*B60R 16/023* (2006.01)
*H04L 29/08* (2006.01)
*H04L 12/40* (2006.01)

(58) Field of Classification Search
CPC ......... H04L 2012/40273; B60R 16/023; G06F 21/64; G06F 21/85
See application file for complete search history.

(56) References Cited

U.S. PATENT DOCUMENTS

| | | | |
|---|---|---|---|
| 2012/0093312 A1 | 4/2012 | Gammel et al. | |
| 2014/0310530 A1* | 10/2014 | Oguma | H04L 9/3242 713/181 |
| 2015/0074404 A1* | 3/2015 | Kasper | H04L 63/08 713/170 |
| 2015/0089236 A1* | 3/2015 | Han | H04L 9/3242 713/181 |
| 2015/0350241 A1* | 12/2015 | Mayer | H04L 63/1441 726/3 |
| 2016/0026787 A1* | 1/2016 | Nairn | G06F 13/4282 726/17 |
| 2016/0205194 A1* | 7/2016 | Kishikawa | H04L 67/12 726/1 |

FOREIGN PATENT DOCUMENTS

| | | |
|---|---|---|
| KR | 10-2005-0064343 A | 6/2005 |
| KR | 10-2009-0085639 A | 8/2009 |
| KR | 10-0930577 B1 | 12/2009 |
| KR | 10-2011-0057348 | 6/2011 |
| KR | 10-1356476 B1 | 1/2014 |
| KR | 10-2014-0023799 | 2/2014 |

* cited by examiner

METHOD OF SEQUENTIALLY AUTHENTICATING CAN PACKETS USING DIVIDED MACS AND APPARATUS FOR IMPLEMENTING THE SAME

CROSS-REFERENCE TO RELATED APPLICATION

This application claims the benefit of and priority to Korean Patent Application No. 10-2014-0133320, filed on Oct. 2, 2014, which is hereby incorporated by reference as if fully set forth herein.

BACKGROUND

Technical Field

The present disclosure relates to a method for authenticating packets in a controller area network (CAN), and more particularly, to an efficient authentication method capable of reducing latency when authenticating packets using a message authentication code (MAC), and an apparatus therefor.

Discussion of the Related Art

In a vehicle, data packet exchange between controllers is performed over a controller area network (CAN). Until recently, since an internal network of a vehicle operates independent of an external network, a means for protecting internal network information of the vehicle has not been provided. Accordingly, due to the properties of a vehicle CAN using a broadcasting method, there is a need for security technology for preventing information about vehicle driving from being stolen via a connection port for vehicle diagnosis or preventing malicious CAN packets from being inserted.

For security of a message in CAN packets, a message authentication code (MAC) method may be considered. The MAC refers to a relatively small amount of information used for message authentication. The MAC method will be described with reference to FIG. 1, which shows a MAC method.

In FIG. 1, it may be assumed that a message 131 is transmitted from a sender 110 to a receiver 120. At this time, the sender and the receiver share a private key (K) 141 and a MAC generation algorithm (i.e., a MAC algorithm 151) in advance. In the sender 110, the private key 141 and the message 131 are input to the MAC algorithm 151 to generate a MAC 161, and the MAC is transmitted to the receiver 120 along with the message 131. In the receiver 120, the received message and the shared private key are input to a MAC algorithm 151' to calculate a MAC 161', and the calculated MAC 161' is compared with the received MAC 161 to verify integrity of the message.

In the CAN, when the MAC method is used for security, a space in a CAN frame, into which MAC data for authentication is inserted, is lacking. More specifically, although data available in the CAN frame has a maximum of 64 bits, if general MAC data is inserted into the frame, the size of the CAN data inserted into the frame is reduced to less than half 64 bits. In addition, it is difficult to apply the MAC method to an electronic apparatus sensitive to latency, such as a vehicle brake or an air bag.

SUMMARY

Accordingly, the present disclosure is directed to a method for authenticating packets in a controller area network (CAN) and an apparatus therefor that substantially obviate one or more problems due to limitations and disadvantages of the related art.

An object of the present disclosure is to provide an efficient message authentication code (MAC) authentication method in a vehicle CAN and an apparatus therefor. Another object of the present disclosure is to provide a MAC authentication method capable of variously adjusting latency and reliability, and an apparatus therefor. Additional advantages, objects, and features of the disclosure will be set forth in the description which follows and will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of transmitting K messages using divided message authentication codes (MACs) in a controller area network (CAN) includes: generating a MAC using a first message and a specific MAC; performing a first operation with respect to j using j-th messages subsequent to the first message and a second MAC part of the generated MAC; performing a second operation with respect to j using a result of the performed first operation and a j-th subblock subsequent to a first MAC subblock among K MAC subblocks obtained by dividing a first MAC part of the generated MAC; transmitting the first message along with the first MAC subblock; and transmitting K-1 j-th messages in an order of j. Each of the j-th messages is transmitted along with a j-th result of the performed second operation.

In another aspect of the present disclosure, a controller for transmitting messages using divided message authentication codes (MACs) in a controller area network (CAN) includes: a message management module configured to generate K messages; an authentication module configured to: i) generate a MAC using a first message of the K messages and a specific MAC, ii) perform a first operation with respect to j using j-th messages subsequent to the first message and a second MAC part of the generated MAC, and iii) perform a second operation with respect to j using a result of the performed first operation and a j-th subblock subsequent to a first MAC subblock among K MAC subblocks obtained by dividing a first MAC part of the generated MAC; and a transceiver module configured to transmit the first message along with the first MAC subblock and to transmit K-1 j-th messages in an order of j. The transceiver module transmits each of the j-th messages along with a j-th result of the performed second operation.

In another aspect of the present disclosure, a method of receiving K messages using divided message authentication codes (MACs) in a controller area network (CAN) includes: receiving a first message and MAC data corresponding to the first message; generating a MAC using the first message and a specific MAC; comparing a first MAC subblock among K MAC subblocks divided by a first MAC part of the generated MAC to the MAC data corresponding to the first message; determining a temporary authentication state when the first MAC subblock divided by the first MAC part is equal to the MAC data; and determining authentication failure when the first MAC subblock divided by the first MAC part is not equal to the MAC data.

In another aspect of the present disclosure, a controller for receiving messages using divided message authentication codes (MACs) in a controller area network (CAN) includes: a transceiver module configured to receive a first message and MAC data corresponding to the first message; and an authentication module configured to: i) generate a MAC using the first message and a specific MAC, ii) compare a first MAC subblock among K MAC subblocks divided by a first MAC part of the generated MAC to the MAC data corresponding to the first message, iii) determine a temporary authentication state when the first MAC subblock divided by the first MAC part is equal to the MAC data, and iv) determine authentication failure when the first MAC subblock divided by the first MAC part is not equal to the MAC data.

It is to be understood that both the foregoing general description and the following detailed description of the present disclosure are exemplary and explanatory and are intended to provide further explanation of the embodiments as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE EMBODIMENTS

Figure 1:
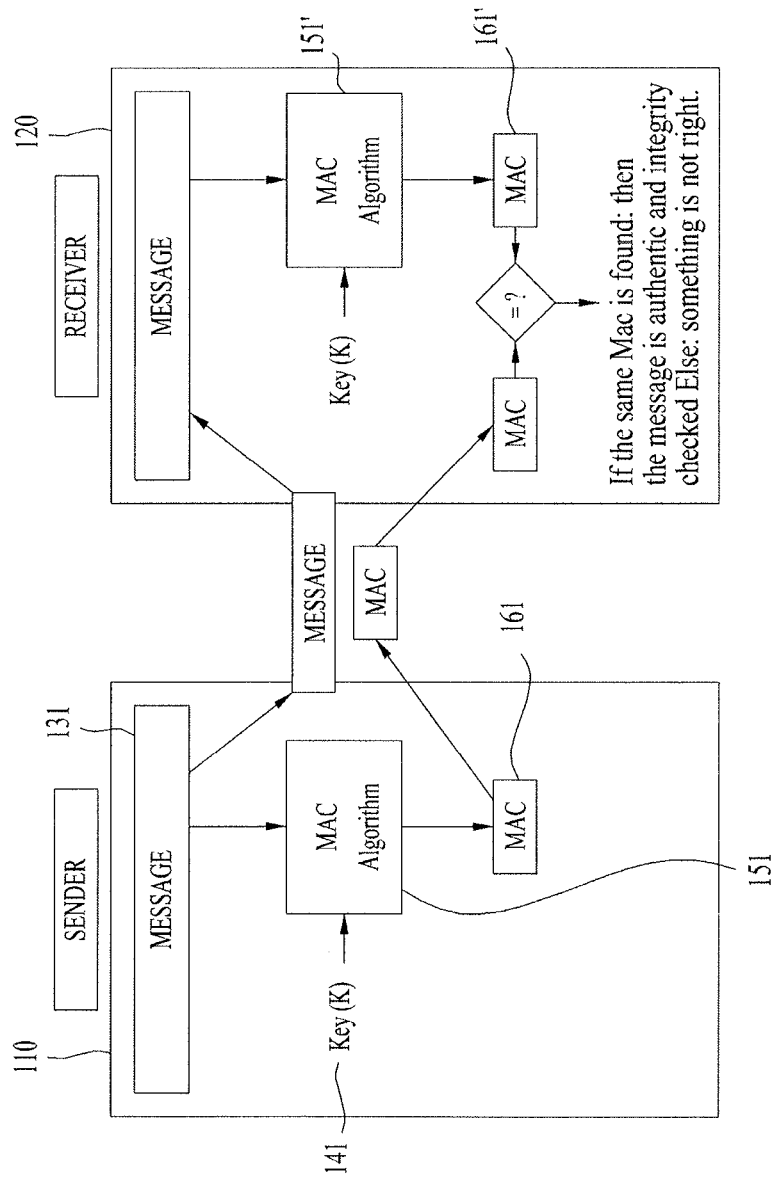
FIG. 1 is a diagram showing a MAC method.

A method of authenticating a CAN message according to the present disclosure will be described in greater detail with reference to the accompanying drawings. The suffixes "module" and "unit" of elements herein are used for convenience of description and thus can be used interchangeably and do not have any distinguishable meanings or functions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the controller.

Furthermore, the control unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Referring now to the disclosed embodiments, in general, if a message authentication code (MAC) method is applied to a vehicle controller area network (CAN), CAN data may be first transmitted and then MAC data of the CAN data may be transmitted. In this case, since a receiver cannot authenticate the CAN data until the MAC data of the first received CAN data is received, latency occurs. This will be described in greater detail with reference to FIG. 2, which is a diagram showing an example of a case in which latency occurs when a general MAC method is applied.

Figure 2:
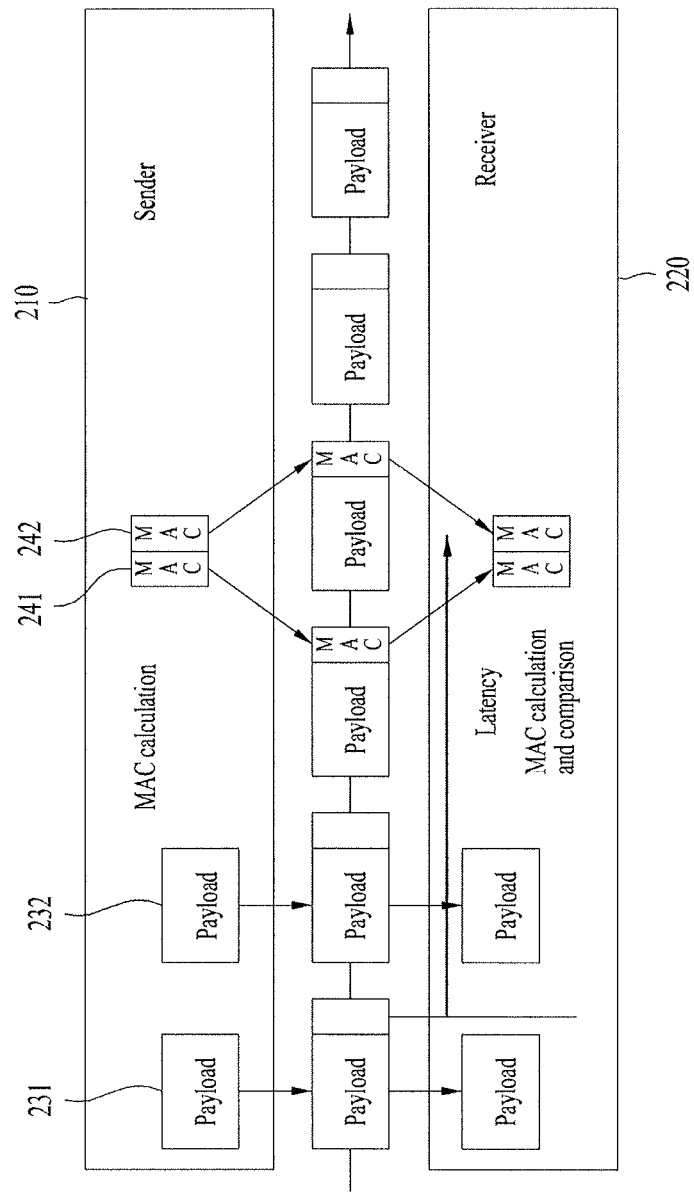
FIG. 2 is a diagram showing an example of a case in which latency occurs when a general MAC method is applied.

Referring to FIG. 2, when messages (that is, payloads 231 and 232) are transmitted from a sender 210 to a receiver 220, the messages are transmitted via different CAN frames. Thereafter, the MAC data of the transmitted messages 231 and 232 are divided into two data 241 and 242 and the two data are transmitted in a state of being included in different frames. Although the receiver 120 may receive the messages via the first received two CAN frames, since the messages cannot be verified until the remaining CAN frames including the divided MACs are received, latency corresponding to three frames occurs from when the message is received via a first frame.

In summary, the MAC data for authentication is not transmitted simultaneously with a message which is desired to be transmitted but is separately transmitted later than the message which is desired to be transmitted. Accordingly, since authentication is not immediately performed, it is difficult to use the MAC data for authentication of critical data which is sensitive to latency. In addition, if any one of the divided MAC data is damaged or lost, all MAC data cannot be used.

In order to solve the above-described problem, according to embodiments of the present disclosure, a method of periodically/aperiodically dividing MAC data for a specific CAN frame, sequentially inserting the divided MAC data into several subsequently transmitted frames, transmitting the MAC data at a sender and sequentially collecting and authenticating the MAC data at a receiver and accumulatively increasing reliability of the received data as the number of collected MAC data is increased is proposed.

Figure 3:
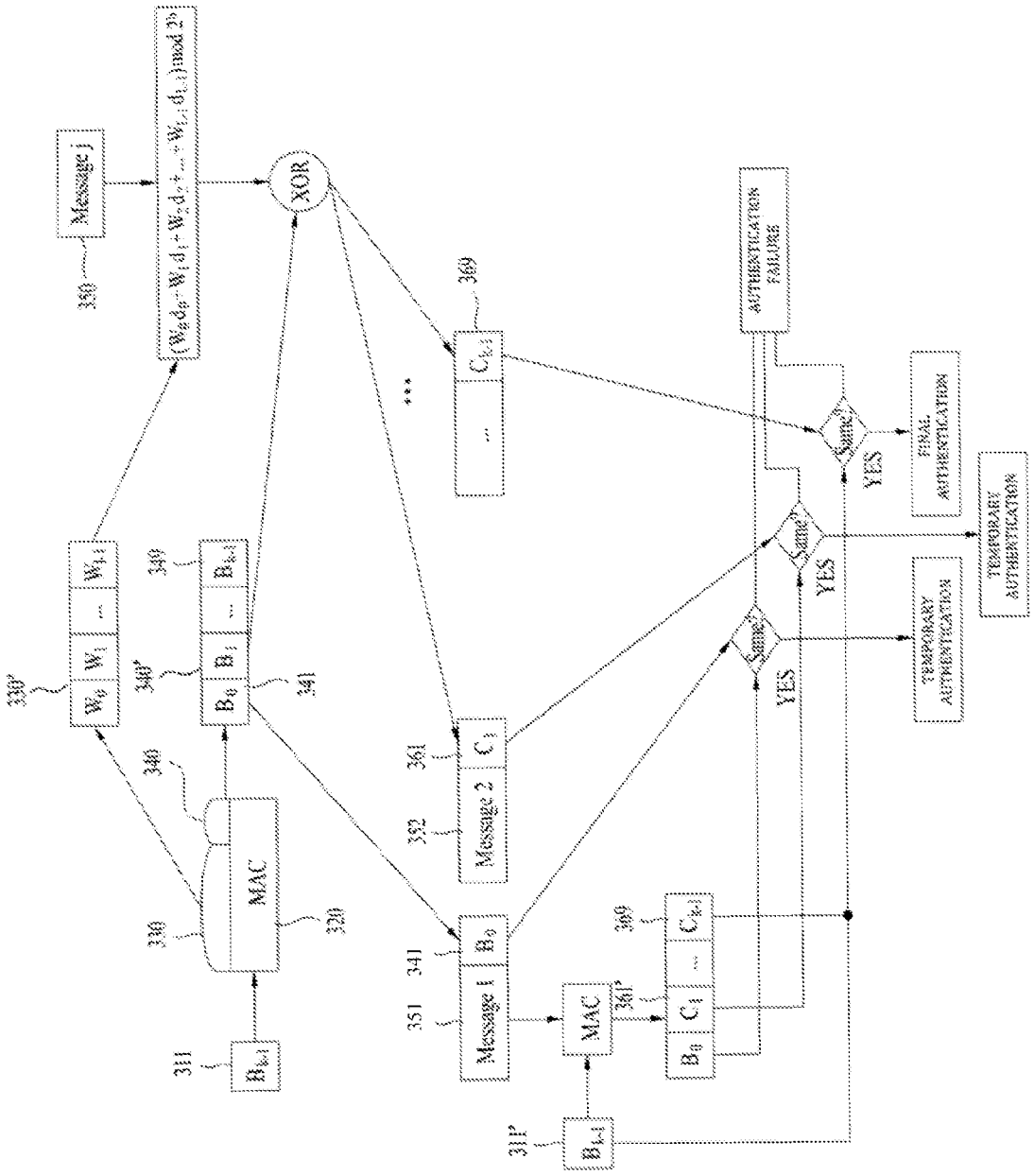
FIG. 3 is a diagram showing an example of a sequential authentication method using divided MAC data according to embodiments of the present disclosure.

FIG. 3 is a diagram showing an example of a sequential authentication method using divided MAC data according to embodiments of the present disclosure.

Referring to FIG. 3, the method of sequentially authenticating CAN packets using divided MAC data according to the present disclosure may include: 1) calculating MAC data 320 from a first message 351 and a previously calculated last MAC subblock 311, 2) performing a linear operation using some data 330 of the generated MAC data 320 and a j-th message 350 in order to generate a middle session key and performing an operation with the divided MACs 340' to generate new MACs 361 and 369, 3) inserting the MACs 341 and 361 to 369 into different CAN frames and sequentially transmitting the MACs, and 4) storing a last MAC subblock 349 for next MAC generation, in a sender. In a receiver, in a reverse order of the operations of the sender, the method may include: 1) regenerating a new MAC using a received first message 351 and a last MAC subblock 311', which has been previously calculated and stored, 2) generating a new MAC (corresponding to 320) using a middle session key and a j-th message, 3) comparing sequentially received MAC subblocks 341 and 361 to 369 and the generated data values, and 4) storing a last subblock 349 for next MAC verification. In the comparison step, the receiver permits use of the message in a "temporary authentication" state if the first subblock 341 and the generated MAC data value are the same and prohibits use of the message in an "authentication failure" state if any one of the received subblocks is different from the generated MAC data value. If the last received subblock and the generated MAC data value are also the same, the message is in a "final authentication" state and thus verification ends. Hereinafter, the above-described process will be described in detail.

First, the sender first generates the MAC 320. The MAC 320 is generated using the message 351 transmitted via a first frame and the lastly calculated MAC subblock 311 via a predetermined MAC algorithm. Some data 340 of the MAC data 320 are used as authentication MAC 340' and the remaining data are used as the middle session key 330' described below. The authentication MAC 340' is divided into K MAC subblocks 341 to 349 by b bits (K is a natural number). K means the number of frames which directly (that is, a first frame which utilizes a first MAC subblock B0 341) or indirectly (that is, a second frame and subsequent frames thereof) utilize the generated MAC 320. Accordingly, the number of frames which directly utilizes the MAC 320 is k-1. In k-1 frames, additional authentication may be performed such that the generated MAC data 320 is associated with the message transmitted in a state of being included in the MAC data 320. For example, if SHA-1 based MAC is used, 160-bits MACs are generated. For CAN frame authentication, 32 bits 340 are used and the remaining 128 bits may be used as a new session key (hereinafter, for convenience, referred to as a "middle session key") for authenticating k-1 middle frames.

The message j 350 to be transmitted via a frame subsequent to a second frame and the middle session key 330' may be divided into L subblocks (0<j<k, and j is a natural number). Hereinafter, a method of deriving L will be described.

The message 350 to be transmitted via a frame subsequent to the second frame is divided into b bits. Here, b bits mean the size of the MAC data in a 64-bit data region (that is, payload) of the CAN frame. For example, if b is 8, the MAC data occupies 8 bits among 64 bits and the message occupies the remaining 56 bits. Accordingly, a middle frame may be divided into a total of 56/8=7 subblocks. As a result, if b is an aliquot part of 64, an integer (64−b)/b=L can always be obtained.

The middle session key 330' may also be divided into L subblocks each having a size of b bits, which are respectively w0, w1, w2, ... wL-1. Blocks of a j-th middle (0<j<k) message are d0, d1, d2, dL-1. If a j-th MAC subblock subsequent to the first MAC subblock 341 of the authentication MAC 340' is $MAC_j$, the value $New\_MAC_j$ of a new MAC to be transmitted along with the middle message j 350 may be calculated via an operation shown in Equation 1 below.

$$New\_MAC_j = MAC_j \oplus ((w_0 d_0 + w_1 d_1 + w_2 d_2 + \ldots + w_{L-1} d_{L-1}) \bmod 2^b)$$ Equation 1:

In Equation 1, Mod $2^b$ refers to an operation for leaving lower b bits and rounding down the remaining higher bits. Through the above-described operation, in the j-th middle frame, MAC data $MAC_j$, which depends on the first message 351 only, is not included but $New\_MAC_j$ including the message of the j-th middle frame is included as MAC data. For example, the second frame includes $C_1$ 361 including the message thereof as MAC data and a K-th frame includes $C_{k-1}$ 369 as MAC data.

The receiver receives the first frame and calculates the MAC using the message 351 included in the first frame and the last MAC subblock 311', which has been previously calculated, via the same method as the method of generating the MAC in the sender. If the frame has been successfully received, the receiver may generate the same MAC as the MAC 320 generated by the sender. The MAC generated by the receiver may be used as the authentication MAC and the MAC for generating the middle session key. First b bits of the authentication MAC part may be used for comparison and verification of the MAC data received via the first frame, that is, the first MAC subblock 341. Values subsequent to the first b bits of the authentication MAC part may be divided by b bits and stored for verification of subsequently received k-1 $New\_MAC_j$.

When the receiver receives a second frame, the message of the frame is divided into b blocks to generate L subblocks and the following operation is performed.

$$Veri\_MAC_j = MAC_j \oplus ((w_0 d_0 + w_1 d_1 + w_2 d_2 + \ldots + w_{L-1} d_{L-1}) \bmod 2^b)$$ Equation 2:

Here, $MAC_j$ of the right hand side is a j-th middle subblock value of the autneitication MAC re-calculated after the receiver has received the first frame, and the value of the right hand side may be calculated using the re-calculated middle session key and the j-th middle reception data. If the received $New\_MAC_j$ and the re-calculated $Veri\_MAC_j$ are the same, it is determined that authentication is successful and, if not, it is determined that authentication fails.

Figure 4:
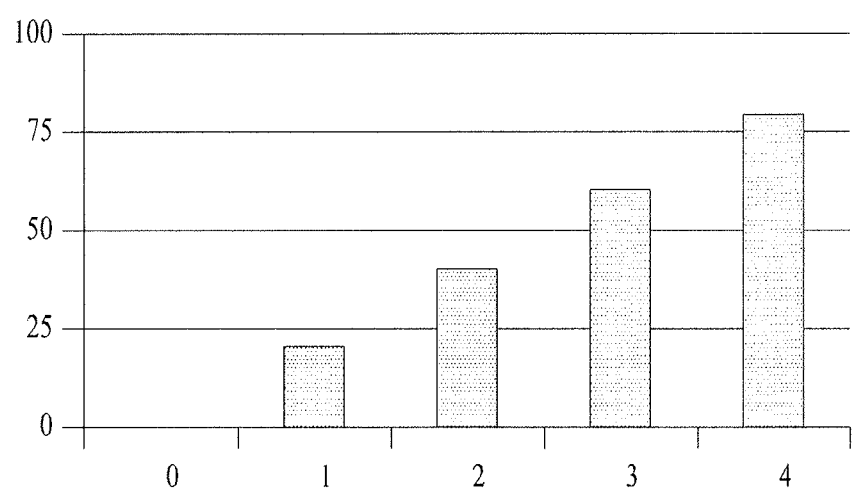
FIG. 4 is a diagram showing increase in reliability of CAN data as the number of divided authentication processes is increased when a receiver receives divided MACs and sequentially performs authentication.

Since the number of times of authentication success using the divided MACs is linearly proportional to reliability as shown in FIG. 4, the receiver may determine a temporary authentication state until the last frame is received and the last $New\_MAC_j$ 369 is authenticated and may determine that all K frames are successfully received if the last authentication is finished.

FIG. 4 is a diagram showing increase in reliability of CAN data as the number of divided authentication processes is increased when a receiver receives divided MAC and sequentially performs authentication.

Some data is sensitive to latency or requires security due to properties of vehicle data. In this case, the divided authentication method according to the present disclosure can variably adjust a tradeoff relationship between latency and security. The number of frames to be collected may be initially set by individually setting the size of the divided MAC by a CAN ID. That is, for data which is sensitive to latency, the size of the divided MAC may be increased to decrease the number of divided MACs. Otherwise, the size of the divided MAC may be decreased to increase the number of frames used for transmission.

In terms of security, an attacker who does not know the session key for generating the MAC cannot re-calculate the MAC of the first frame and thus cannot know the subsequently output middle session keys $w0, w1, w2, \ldots, wL-1$. Accordingly, it is difficult to accurately generate New_$MAC_j$. That is, although authentication for the middle frame is simply performed by a linear operation, when the middle session keys are not known, the number of 0s and 1s of the message are uniform and the message has random distribution, $((w0d0+w1d1+w2d2+ \ldots +wL-1dL-1) \mod 2^b$ cannot be accurately calculated. Although the same session key is used, since the middle session keys calculated by the message and the last subblock of the previous authentication MAC may be changed, the middle session keys may be protected even when a specific middle session key is compromised. Since the last subblock of the previously calculated authentication MAC is used for MAC operation along with the message such that different MAC values are generated with respect to the data of the same message, a problem that the same MAC is generated with respect to the same message may be solved. From the viewpoint of data transmission efficiency, the divided MAC having a large size may be transmitted such that only a relatively small region of a CAN frame is used for authentication.

Figure 5:
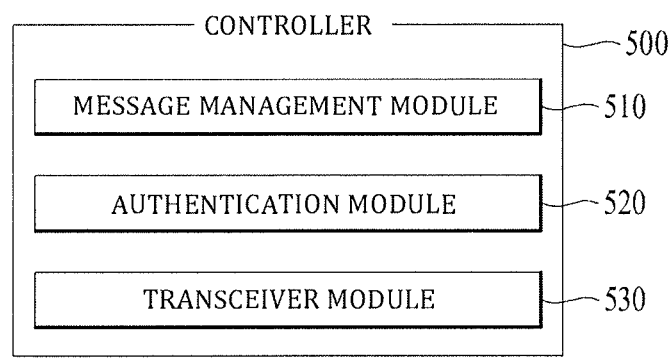
FIG. 5 is a block diagram showing an example of the structure of an apparatus for performing authentication using divided MACs according to embodiments of the present disclosure.

Next, the structure of an apparatus for performing the above-described time synchronization method will be described with reference to FIG. 5. FIG. 5 is a block diagram showing an example of the structure of an apparatus for performing authentication using divided MACs according to embodiments of the present disclosure.

The above-described method of performing authentication using the divided MACs may be performed by a CAN controller 500. This authentication method may be used in all CAN controllers over a network or only in some CAN controllers handling sensitive data.

The CAN controller 500 according to the present disclosure may include a message management module 510 for generating or processing a message, an authentication module 520 for generating and managing MAC data and performing authentication using divided MACs, and a transceiver module 530 for performing communication using a CAN method. Although the controller is shown in FIG. 5 as including components necessary to implement the present disclosure only, the controller may include more components if necessary.

More specifically, in the case in which the controller 500 transmits a message to a network (that is, the controller functions as a sender), the message management module 510 generates a message to be transmitted to the network. The authentication module 520 generates a new MAC using a first message generated by the message management module 510 and a last divided MAC of a previously generated authentication MAC and generates an authentication MAC and middle session keys using the new MAC. The transceiver module 530 transmits the first message to the network via a CAN frame along with a first divided MAC of the authentication MAC. The authentication module 520 may divide a second message (that is, a first middle message) by the number of middle session keys, perform a linear operation and generate MAC data via an XOR operation with a next divided MAC of the authentication MAC. In addition, the authentication module 520 may store the last divided MAC for next transmission.

In the case in which the controller 500 receives a message from the network (that is, the controller functions as a receiver), the transceiver module 530 receives CAN frames from the network. The authentication module 520 calculates a MAC using the message received via a first CAN frame and a last divided MAC of a previously generated authentication MAC, determines whether a first divided MAC of the authentication MAC is the same as a MAC of a first received frame, and determines a temporary authentication state if the MACs are the same. Thereafter, the authentication module 520 may sequentially authenticate middle messages via comparison with a new MAC New_$MAC_j$, which is received using a verification MAC Veri_$MAC_j$, using the middle session keys, a next divided MAC of the authentication MAC and the middle messages in the calculated MAC. The messages, authentication of which has been completed, may be interpreted and managed by the message management module 510.

The above-described CAN message authentication method is not limited to the configurations of the above-described embodiments and various modifications may be made by selectively combining all or some of the above-described embodiments.

Accordingly, it is possible to efficiently perform authentication in a vehicle CAN through the above-described authentication methods according to embodiments of the present disclosure. In particular, it is possible to variously adjust latency and reliability depending on the size of a divided MAC. Since the MAC is divided, it is possible to increase the amount of CAN data in a CAN frame. In addition, it is possible to sequentially improve reliability with relatively low latency.

It will be apparent to those skilled in the art that various modifications and variations can be made in the present embodiments without departing from the spirit or scope of the disclosure. Thus, it is intended that the present disclosure covers the modifications and variations of the present embodiments provided they come within the scope of the appended claims and their equivalents.

What is claimed is:

1. A method of transmitting K messages to a receiver using divided message authentication codes (MACs) in a controller area network (CAN), the method comprising:
   generating, by a controller including a memory and a processor, a MAC using a MAC generating algorithm shared in advance with the receiver and a session key, wherein a first message and a specific MAC are input to the MAC generation algorithm;
   performing, by the controller, a first operation with respect to j using j-th messages subsequent to the first message and a second MAC part of the generated MAC;
   performing, by the controller, a second operation with respect to j using a result of the performed first operation and a j-th subblock subsequent to a first MAC subblock among K MAC subblocks obtained by dividing a first MAC part of the generated MAC;

transmitting, by the controller, the first message along with the first MAC subblock to the reciever; and transmitting, by the controller, K-1 j-th messages in an order of j to the receiver, wherein each of the j-th messages is transmitted along with a j-th result of the performed second operation, and wherein j and K are natural numbers, and $0<j<K$.

2. The method according to claim 1, further comprising storing, by the controller, a K-th MAC subblock of the first MAC part as a specific MAC for generating MACs corresponding to K subsequent messages.

3. The method according to claim 2, wherein the performing of the second operation includes performing, by the controller, an exclusive OR (XOR) operation between the acquired lower bits and the j-th subblock with respect to j.

4. The method according to claim 1, wherein the performing of the first operation includes:
  dividing, by the controller, each of the j-th messages into subblocks corresponding in number to a second value obtained by dividing a number obtained by subtracting a first value, which is a bit size of each MAC subblock, from 64 by the first value;
  dividing, by the controller, the second MAC part into subblocks corresponding in number to the second value;
  summing, by the controller, results of multiplying each of the divided subblocks of the j-th messages and each of the divided subblocks of the second MAC part, which are located in the same order; and
  acquiring, by the controller, lower bits of a number corresponding to the first value.

5. The method according to claim 1, wherein the specific MAC is a K-th MAC subblock of the first MAC part of a MAC corresponding to previously transmitted K messages.

6. A controller for transmitting messages to a receiver using divided message authentication codes (MACs) in a controller area network (CAN), the controller comprising:
  a memory configured to store program instructions; and
  a processor configured to execute the stored program instructions, which when executed cause the processor to operate as:
    a message management module configured to generate K messages;
    an authentication module configured to: i) generate a MAC using a MAC generation algorithm shared in advance with the receiver and a session key, wherein a first message of the K messages and a specific MAC are input to the MAC generation algorithm, ii) perform a first operation with respect to j using j-th messages subsequent to the first message and a second MAC part of the generated MAC, and iii) perform a second operation with respect to j using a result of the performed first operation and a j-th subblock subsequent to a first MAC subblock among K MAC subblocks obtained by dividing a first MAC part of the generated MAC; and
    a transceiver module configured to transmit the first message along with the first MAC subblock to the receiver and to transmit K-1 j-th messages in an order of j to the receiver,
  wherein the transceiver module transmits each of the j-th messages along with a j-th result of the performed second operation, and
  wherein j and K are natural numbers, and $0<j<K$.

7. The controller according to claim 6, wherein the authentication module is further configured to store a K-th MAC subblock of the first MAC part as a specific MAC for generating MACs corresponding to K subsequent messages.

8. The controller according to claim 6, wherein the authentication module is further configured to: i) divide each of the j-th messages into subblocks corresponding in number to a second value obtained by dividing a number obtained by subtracting a first value, which is a bit size of each MAC subblock, from 64 by the first value, ii) divide the second MAC part into subblocks corresponding in number to the second value, ii) sum results of multiplying each of the divided subblocks of the j-th messages and each of the divided subblocks of the second MAC part, which are located in the same order, and iv) acquire lower bits of a number corresponding to the first value, upon performing the first operation.

9. The controller according to claim 7, wherein the authentication module is further configured to perform an exclusive OR (XOR) operation between the acquired lower bits and the j-th subblock with respect to j.

10. The controller according to claim 6, wherein the specific MAC is a K-th MAC subblock of the first MAC part of a MAC corresponding to previously transmitted K messages.

11. A method of receiving K messages from a sender using divided message authentication codes (MACs) in a controller area network (CAN), the method comprising:
  receiving, by a controller including a memory and a processor, a first message and MAC data corresponding to the first message from the sender;
  generating, by the controller, a MAC using a MAC generation algorithm shared in advance with the sender and a session key, wherein the first message and a specific MAC are input to the MAC generation algorithm;
  dividing by the controller, a first MAC part of the generated MAC into K MAC subblocks;
  comparing, by the controller, a first MAC subblock among the K MAC subblocks to the MAC data corresponding to the first message;
  determining, by the controller, a temporary authentication state when the first MAC subblock is equal to the MAC data; and
  determining, by the controller, authentication failure when the first MAC subblock is not equal to the MAC data.

12. The method according to claim 11, further comprising:
  receiving, by the controller, j-th messages subsequent to the first message in an order of j;
  performing, by the controller, a first operation with respect to j using the j-th messages and a second MAC part of the generated MAC;
  performing, by the controller, a second operation with respect to j using a result of the performed first operation and a j-th subblock subsequent to the first MAC subblock among the K MAC subblocks divided from the first MAC part of the generated MAC;
  sequentially comparing, by the controller, a j-th result of the performed second operation to j-th MAC data received along with each j-th message, with respect to j; and
  determining, by the controller, a final authentication state when MAC data received along with a most recent message and a last result of the performed second operation are equal to the sequentially compared result.

13. The method according to claim 12, further comprising storing, by the controller, a K-th MAC subblock of the first MAC part as a specific MAC for generating MACs corresponding to K subsequent messages.

14. The method according to claim 12, wherein the performing of the first operation includes:
dividing, by the controller, each of the j-th messages into subblocks corresponding in number to a second value obtained by dividing a number obtained by subtracting a first value, which is a bit size of each MAC subblock, from 64 by the first value;
dividing, by the controller, the second MAC part into subblocks corresponding in number to the second value;
summing, by the controller, results of multiplying each of the divided subblocks of the j-th messages and each of the divided subblocks of the second MAC part, which are located in the same order; and
acquiring, by the controller, lower bits of a number corresponding to the first value.

15. The method according to claim 14, wherein the performing of the second operation includes performing, by the controller, an exclusive OR (XOR) operation between the acquired lower bits and the j-th subblock with respect to j.

16. The method according to claim 12, wherein the specific MAC is a K-th MAC subblock of the first MAC part of a MAC corresponding to previously received K messages.

17. A controller for receiving messages from a sender using divided message authentication codes (MACs) in a controller area network (CAN), the controller comprising:
a memory configured to store program instructions; and
a processor configured to execute the stored program instructions, which when executed cause the processor to operate as:
a transceiver module configured to receive a first message and MAC data corresponding to the first message from the sender; and
an authentication module configured to: i) generate a MAC using a MAC generation algorithm shared in advance with the sender and a session key, wherein the first message and a specific MAC are input to the MAC generation algorithm, ii) divide a first MAC part of the generated MAC into K MAC subblocks, iii) compare a first MAC subblock among the K MAC subblocks to the MAC data corresponding to the first message, iv) determine a temporary authentication state when the first MAC subblock is equal to the MAC data, and v) determine authentication failure when the first MAC subblock is not equal to the MAC data.

18. The controller according to claim 17, wherein:
the transceiver module is further configured to receive j-th messages subsequent to the first message in an order of j, and
the authentication module is further configured to: i) perform a first operation with respect to j using the j-th message and a second MAC part of the generated MAC, ii) perform a second operation with respect to j using a result of the performed first operation and a j-th subblock subsequent to a first MAC subblock among K MAC subblocks divided from a first MAC part of the generated MAC, iii) sequentially compare a j-th result of the second operation to j-th MAC data received along with each j-th message, with respect to j, and iv) determine a final authentication state when MAC data received along with a most recent message is equal to a last result of the performed second operation as the sequentially compared result.

19. The controller according to claim 18, wherein the authentication module is further configured to store a K-th MAC subblock of the first MAC part as a specific MAC for generating MACs corresponding to K subsequent messages.

20. The controller according to claim 18, wherein the authentication module is further configured to: i) divide each of the j-th message into subblocks corresponding in number to a second value obtained by dividing a number obtained by subtracting a first value, which is a bit size of each MAC subblock, from 64 by the first value, ii) divide the second MAC part into subblocks corresponding in number to the second value, iii) sum results of multiplying each of the divided subblocks of the j-th messages and each of the divided subblocks of the second MAC part, which are located in the same order, and iv) acquire lower bits of a number corresponding to the first value.

21. The controller according to claim 20, wherein the authentication module is further configured to perform an exclusive OR (XOR) operation between the acquired lower bits and the j-th subblock with respect to j, upon performing the second operation.

22. The controller according to claim 18, wherein the specific MAC is a K-th MAC subblock of the first MAC part of a MAC corresponding to previously received K messages.

* * * * *